(12) United States Patent
Carr et al.

(10) Patent No.: US 10,676,033 B1
(45) Date of Patent: Jun. 9, 2020

(54) DEPLOYABLE STEP ASSEMBLY FOR VEHICLES

(71) Applicant: Jeffrey Carr, Temecula, CA (US)

(72) Inventors: Jeffrey Carr, Murrieta, CA (US); Gordon Oney, Murrieta, CA (US)

(73) Assignee: Jeffrey Carr, Temecula, CA (US)

( * ) Notice: Subject to any disclaimer, the term of this patent is extended or adjusted under 35 U.S.C. 154(b) by 0 days.

(21) Appl. No.: 16/171,935

(22) Filed: Oct. 26, 2018

Related U.S. Application Data (60) Provisional application No. 62/578,381, filed on Oct. 27, 2017.

(51) Int. Cl.
*B60R 3/02* (2006.01)

(52) U.S. Cl.
CPC ...................................... *B60R 3/02* (2013.01)

(58) Field of Classification Search
CPC .. B60R 3/02; B60R 3/00; B60R 3/002; B60R 3/005
USPC .................................................. 280/166, 163
See application file for complete search history.

(56) References Cited

U.S. PATENT DOCUMENTS

| | | | |
|---|---|---|---|
| 3,039,562 A * | 6/1962 | Wagner | B60R 3/02 182/91 |
| 3,095,216 A | 6/1963 | Browne et al. | |
| 4,020,920 A * | 5/1977 | Abbott | B60R 3/02 182/19 |
| 4,623,160 A * | 11/1986 | Trudell | B60R 3/02 182/127 |
| 5,538,265 A | 7/1996 | Chen et al. | |
| 5,547,040 A | 8/1996 | Hanser et al. | |
| 6,834,875 B2 | 12/2004 | Leitner et al. | |
| 6,926,295 B2 * | 8/2005 | Berkebile | B60R 3/002 280/163 |
| 6,938,909 B2 | 9/2005 | Leitner | |
| 6,942,233 B2 | 9/2005 | Leitner et al. | |
| 7,007,961 B2 | 3/2006 | Leitner et al. | |
| 7,055,839 B2 * | 6/2006 | Leitner | B60R 3/002 105/443 |
| 7,118,120 B2 | 10/2006 | Lee et al. | |
| 7,163,221 B2 | 1/2007 | Leitner | |
| 7,380,807 B2 | 6/2008 | Leitner | |
| 7,398,985 B2 | 7/2008 | Leitner et al. | |
| 7,413,204 B2 | 8/2008 | Leitner | |
| 7,487,986 B2 | 2/2009 | Leitner et al. | |
| 7,584,975 B2 | 9/2009 | Leitner | |
| 8,157,277 B2 | 4/2012 | Leitner et al. | |
| 8,297,635 B2 | 10/2012 | Agoncillo et al. | |
| 8,408,571 B2 | 4/2013 | Leitner et al. | |
| 8,668,217 B2 | 3/2014 | Ziaylek et al. | |
| 8,827,294 B1 | 9/2014 | Leitner et al. | |
| 8,844,957 B2 | 9/2014 | Leitner et al. | |
| 9,272,667 B2 | 3/2016 | Smith | |

(Continued)

*Primary Examiner* — John D Walters
(74) *Attorney, Agent, or Firm* — Donald E. Stout; Stout, Uxa & Buyan, LLP (57) ABSTRACT

A dependable, simple, safe electrically actuated step system for a larger vehicle, such as a van or truck, which is compact and lightweight, includes a step base, a step member movably secured to the step base between a retracted position and a deployed position, and swing arm assemblies which movably secure the step member to the step base. A plunger actuator moves between a retracted position and an extended position to retract and extend the step, responsive to door position or a manual switch.

12 Claims, 9 Drawing Sheets

(56) References Cited

U.S. PATENT DOCUMENTS

| | | |
|---|---|---|
| 9,302,626 B2 | 4/2016 | Leitner et al. |
| 9,346,405 B2 | 5/2016 | Leitner et al. |
| 9,403,487 B1 | 8/2016 | Diehl et al. |
| 9,434,317 B2 | 9/2016 | Nania |
| 9,511,717 B2 | 12/2016 | Smith |
| 9,522,634 B1 | 12/2016 | Smith |
| 9,527,449 B2 | 12/2016 | Smith |
| 9,550,458 B2 | 1/2017 | Smith et al. |
| 9,561,751 B2 | 2/2017 | Leitner et al. |
| 9,701,249 B2 | 7/2017 | Leitner et al. |
| 9,739,078 B2 | 8/2017 | Diehl et al. |
| 10,272,842 B2 * | 4/2019 | Du .................... B60R 3/02 |
| 2010/0320714 A1 * | 12/2010 | Webb .................. B60R 3/02 280/166 |
| 2017/0144606 A1 | 5/2017 | Smith |

* cited by examiner

DEPLOYABLE STEP ASSEMBLY FOR VEHICLES

This application claims the benefit under 35 U.S.C. 119(e) of the filing date of Provisional U.S. Application Ser. No. 62/578,381, entitled Deployable Step Assembly for Vehicles, filed on Oct. 27, 2017, which application expressly incorporated herein by reference, in its entirety.

BACKGROUND OF THE INVENTION

Retractable steps for larger vehicles, such as pick-up trucks, work trucks, vans, and RV's are well known in the art. However, such steps are typically relatively complex in their construction, require excessive space for operation between the retracted and deployed modes, excessively heavy, and otherwise unsatisfactory.

What is needed is a simple, dependable, space-efficient, electrically-actuated retractable step system for larger vehicles which may be offered as original equipment or as an after-market accessory system.

SUMMARY OF THE INVENTION

The present invention addresses the need noted above, by providing a dependable, simple, safe electrically actuated step system for a larger vehicle, which is compact and lightweight, and may be supplied with the vehicle, or sold and installed as an after-market system.

More particularly, there is provided an innovative deployable step assembly for vehicles, which comprises a step base fixedly attachable to a vehicle, a step member movably secured to the step base between a retracted position and a deployed position, and first and second swing arm assemblies which movably secure the step member to the step base. The first and second swing arm assemblies are connected to the step member on a first end thereof and are connected to the step base on a second end thereof. An actuator is disposed on the step base, wherein the actuator comprises a plunger movable between a retracted position and an extended position. Extension of the plunger causes resultant movement of the first and second swing arm assemblies to move the step member to its deployed position and retraction of the plunger causes resultant movement of the first and second swing arm assemblies to move the step member to its retracted position.

An advantage of the present invention is its compact and simple configuration. For example, a stroke length of the plunger in the inventive system may be less than two inches (e.g. between one-half and two inches), and in an exemplary embodiment is about one inch.

The step base comprises a front downwardly depending member, and the step member is in contacting engagement with the front downwardly depending member when the step member is in its retracted position.

Another advantageous feature of the present invention is that the system comprises a stop member which engages a portion of the first or second swing arm assembly when the step member reaches its deployed position to prevent further deployment. Each of the first and second swing arm assemblies comprise a step arm connected on one end to the step member and a swing arm pivotally connected at a first end thereof to the step arm. The stop member in an exemplary embodiment comprises a first stop member which engages a portion of the first swing arm assembly and a second stop member which engages a portion of the second swing arm assembly, wherein the first stop member comprises a fastener disposed on the step arm of the first swing arm assembly and the second stop member comprises a fastener disposed on the step arm of the second swing arm assembly. The portion of the first swing arm assembly engaged by the first stop member is the swing arm of the first swing arm assembly and the portion of the second swing arm assembly engaged by the second stop member is the swing arm of the second swing arm assembly.

The actuator further comprises swing arm lever, the swing arm lever moving in a first direction responsive to engagement with a distal end of the plunger when the plunger is moved to its extended position and moving in a second opposing direction responsive to disengagement of the plunger when the plunger is moved to its retracted position, wherein the movement of the swing arm lever in the first direction actuates the step member to move toward its deployed position and the movement of the swing arm lever in the second opposing direction actuates the step member to move toward its retracted position.

A shaft is rotatably disposed on the step base, the swing arm lever being disposed on the shaft so that movement of the swing arm lever in said first direction drives the shaft to rotate in a first direction and movement of the swing arm lever in said second direction drives the shaft to rotate in a second direction. A second end of the swing arm in each of the first and second swing arm assemblies is connected to the shaft, so that rotation of the shaft causes movement of the swing arm responsive to the shaft rotation. Rotation of the shaft in the first direction causes responsive movement of each of the swing arms to move the step member to its deployed position and rotation of the shaft in the second direction causes responsive movement of each of the swing arms to move the step member to its retracted position.

In another aspect of the invention, there is provided there is provided a vehicle having an innovative deployable step assembly disposed thereon. The deployable step assembly comprises a step base fixedly attachable to the vehicle, a step member movably secured to the step base between a retracted position and a deployed position, and first and second swing arm assemblies which movably secure the step member to the step base. The first and second swing arm assemblies are connected to the step member on a first end thereof and are connected to the step base on a second end thereof. An actuator is disposed on the step base, wherein the actuator comprises a plunger movable between a retracted position and an extended position. Extension of the plunger causes resultant movement of the first and second swing arm assemblies to move the step member to its deployed position and retraction of the plunger causes resultant movement of the first and second swing arm assemblies to move the step member to its retracted position.

In still another aspect of the invention, there is provided a deployable step assembly for vehicles, which comprises a step base fixedly attachable to a vehicle, a step member movably secured to the step base between a retracted position and a deployed position, and a swing arm assembly which movably secures the step member to the step base. The swing arm assembly is connected to the step member on a first end thereof and is connected to the step base on a second end thereof. An actuator is disposed on the step base, which comprises a plunger movable between a retracted position and an extended position, wherein extension of the plunger causes resultant movement of the swing arm assembly to move the step member to its deployed position and wherein retraction of the plunger causes resultant movement of the first and second swing arm assemblies to move the step member to its retracted position. Advantageously, a stop member is provided which engages a portion of the swing arm assembly when the step member reaches its deployed position to prevent further deployment.

The swing arm assembly comprises a step arm connected on one end to the step member and a swing arm pivotally connected at a first end thereof to the step arm. In an exemplary embodiment, the stop member comprises a fastener disposed on the step arm of the swing arm assembly. The portion of the swing arm assembly engaged by the stop member is the swing arm.

The actuator further comprises a swing arm lever, the swing arm lever moving in a first direction responsive to engagement with a distal end of the plunger when the plunger is moved to its extended position and moving in a second opposing direction responsive to disengagement of the plunger when the plunger is moved to its retracted position, wherein the movement of the swing arm lever in the first direction actuates the step member to move toward its deployed position and the movement of the swing arm lever in the second opposing direction actuates the step member to move toward its retracted position. A shaft is rotatably disposed on the step base, the swing arm lever being disposed on the shaft so that movement of the swing arm lever in the first direction drives the shaft to rotate in a first direction and movement of the swing arm lever in the second direction drives the shaft to rotate in a second direction. A second end of the swing arm is connected to the shaft, so that rotation of the shaft causes movement of the swing arm responsive to the shaft rotation. More particularly, rotation of the shaft in the first direction causes responsive movement of the swing arm to move the step member to its deployed position and rotation of the shaft in the second direction causes responsive movement of the swing arm to move the step member to its retracted position.

Thus, what is advantageously disclosed is a simple and reliable method of operating an electric step between retracted and deployed positions. When a vehicle door is opened, or a manual switch is actuated, an actuator operates to extend a plunger to an advanced position, wherein the distal end of the plunger engages a swing arm lever and moves the lever in a first direction. The swing arm lever is disposed on a rotatable shaft which rotates responsive to movement of the lever in a first rotational direction. This rotational movement of the shaft causes a swing arm (two swing arms in the exemplary embodiment) to be pushed forwardly, thereby in turn each causing a step arm and upper swing arm, forming part of a swing arm assembly, to follow. Movement of the swing arm assembly(ies) causes extension of the connected step member.

To retract the step member, the actuator is initiated by closing the vehicle door or again actuating a manual switch. The plunger retracts, causing the swing arm lever to follow and return to its initial position, moving in a second direction opposite to the first direction. This movement rotates the shaft in an opposing second rotational direction. This rotational movement of the shaft causes the swing arm(s) to move rearwardly, ultimately causing retraction of the connected step member.

The invention, together with additional features and advantages thereof, may best be understood by reference to the following description taken in conjunction with the accompanying illustrative drawings.

DETAILED DESCRIPTION OF THE INVENTION

Referring now more particularly to the drawings, there is shown in FIGS. 1-7 an electrically actuated vehicle step assembly 10. The step assembly 10 comprises a step 12, which may comprise a cast plastic step and a step steel support secured together by suitable fastening means such as bolts, though alternative constructions are within the scope of the invention. The step 12 is supported on a step base 14, by swing arm assemblies 16 on opposed sides thereof, each swing arm assembly 16 comprising a swing arm 18 and a step arm 20, pivotally joined together at pivot joints 22.

Figure 7:
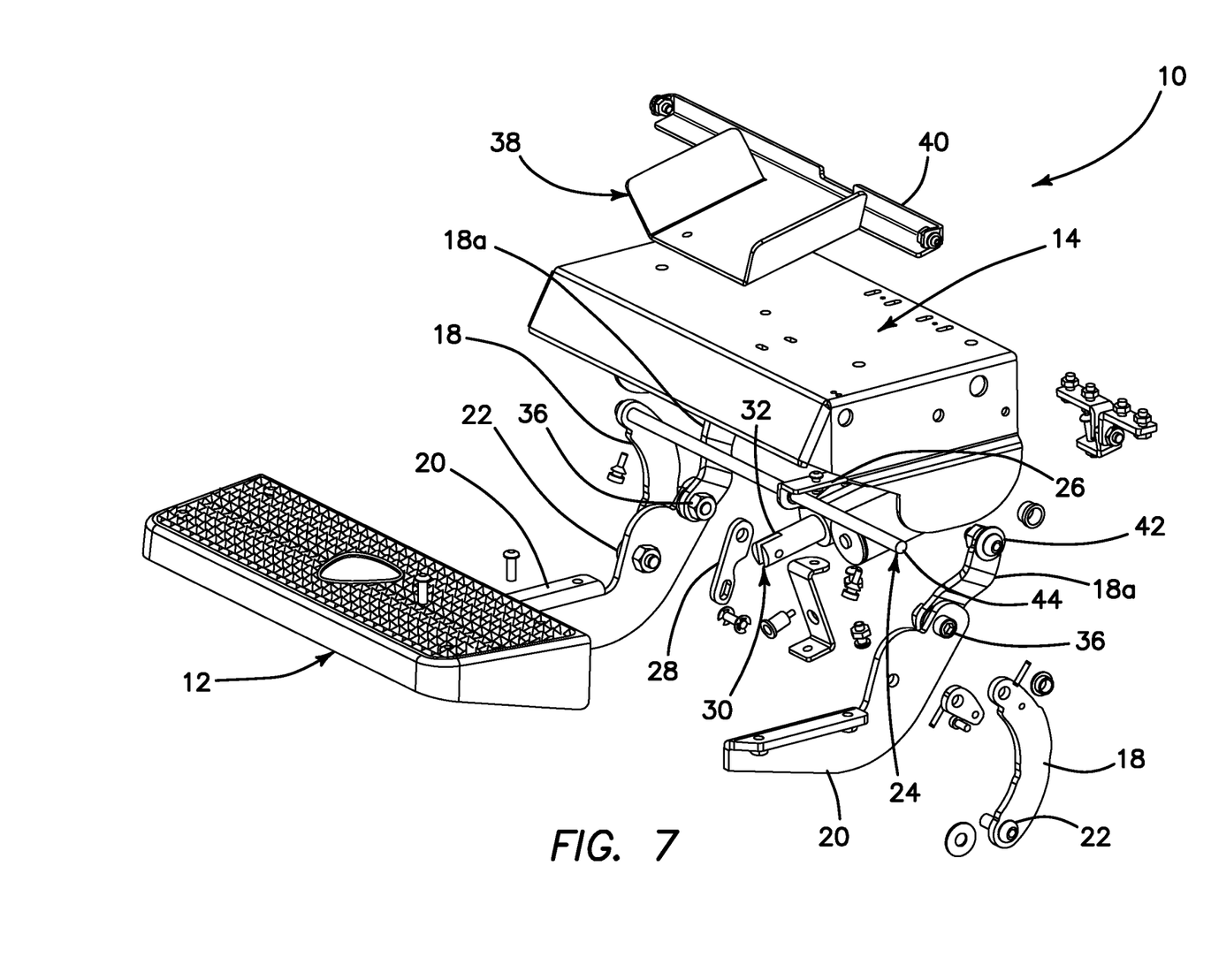
FIG. 7 is an exploded view of an exemplary embodiment of the inventive step assembly.

As shown in FIG. 7, the swing arm assemblies 16 are mounted on a main support shaft 24, on each end thereof, which shaft 24 is disposed in the step assembly 10 and supported thereto by a shaft support 26. Swing arm lever 28 is disposed on the shaft at the location of the shaft support.

Figure 1:
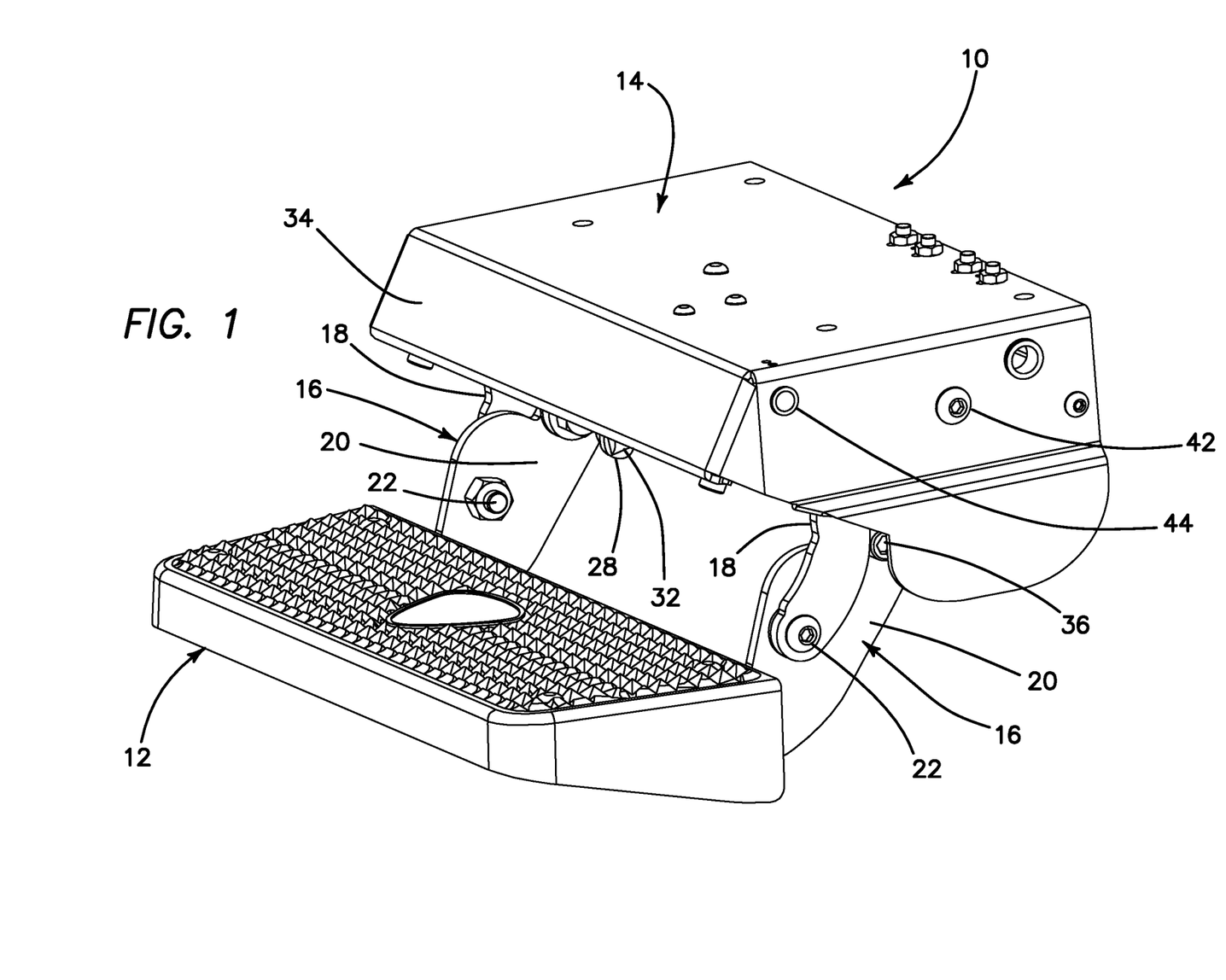
FIG. 1 is an isometric view of an exemplary embodiment of a deployable electric step assembly constructed in accordance with the principles of the present invention, shown in the deployed configuration.
Figure 2:
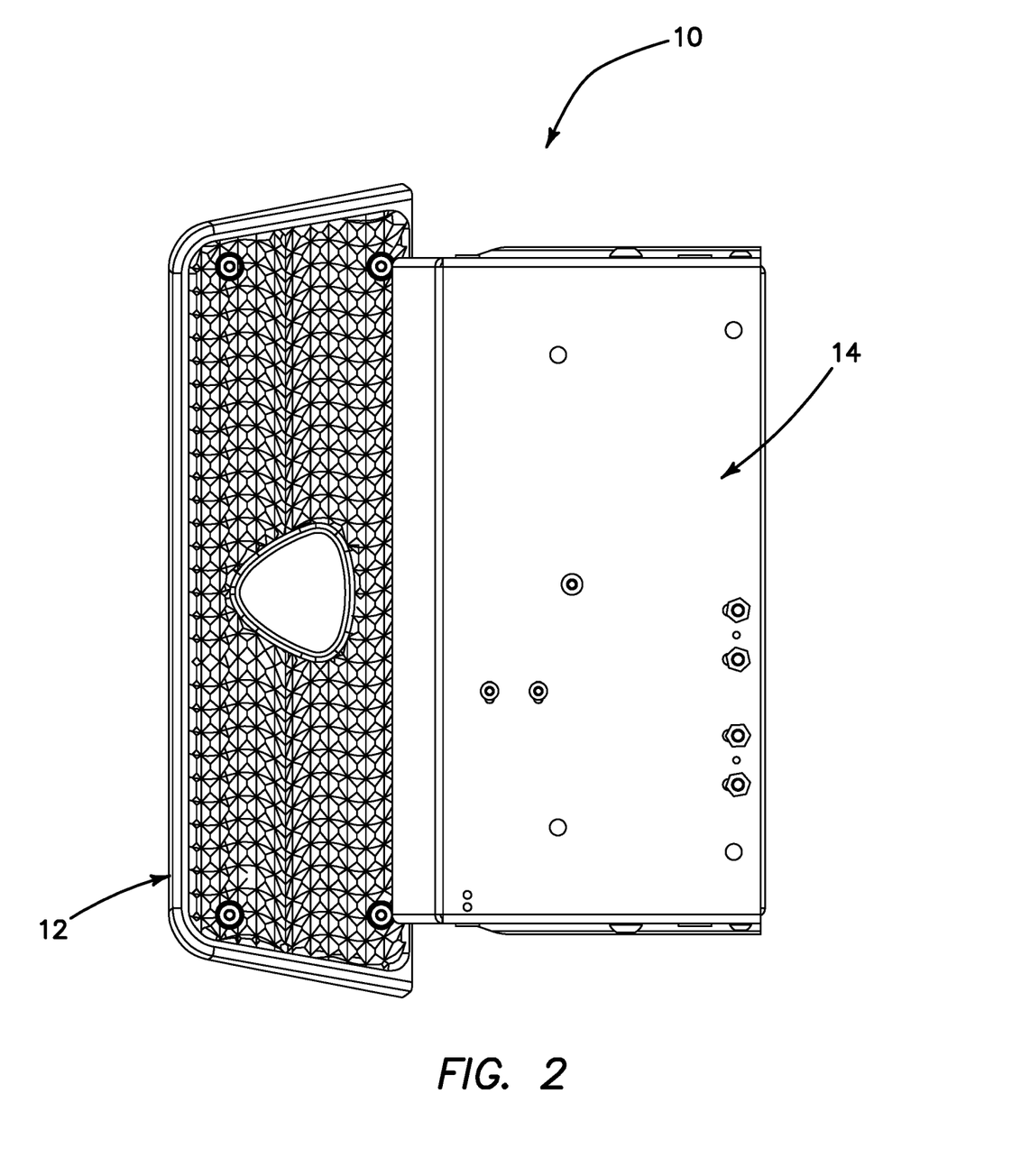
FIG. 2 is a top view of the step assembly of FIG. 1.
Figure 3:
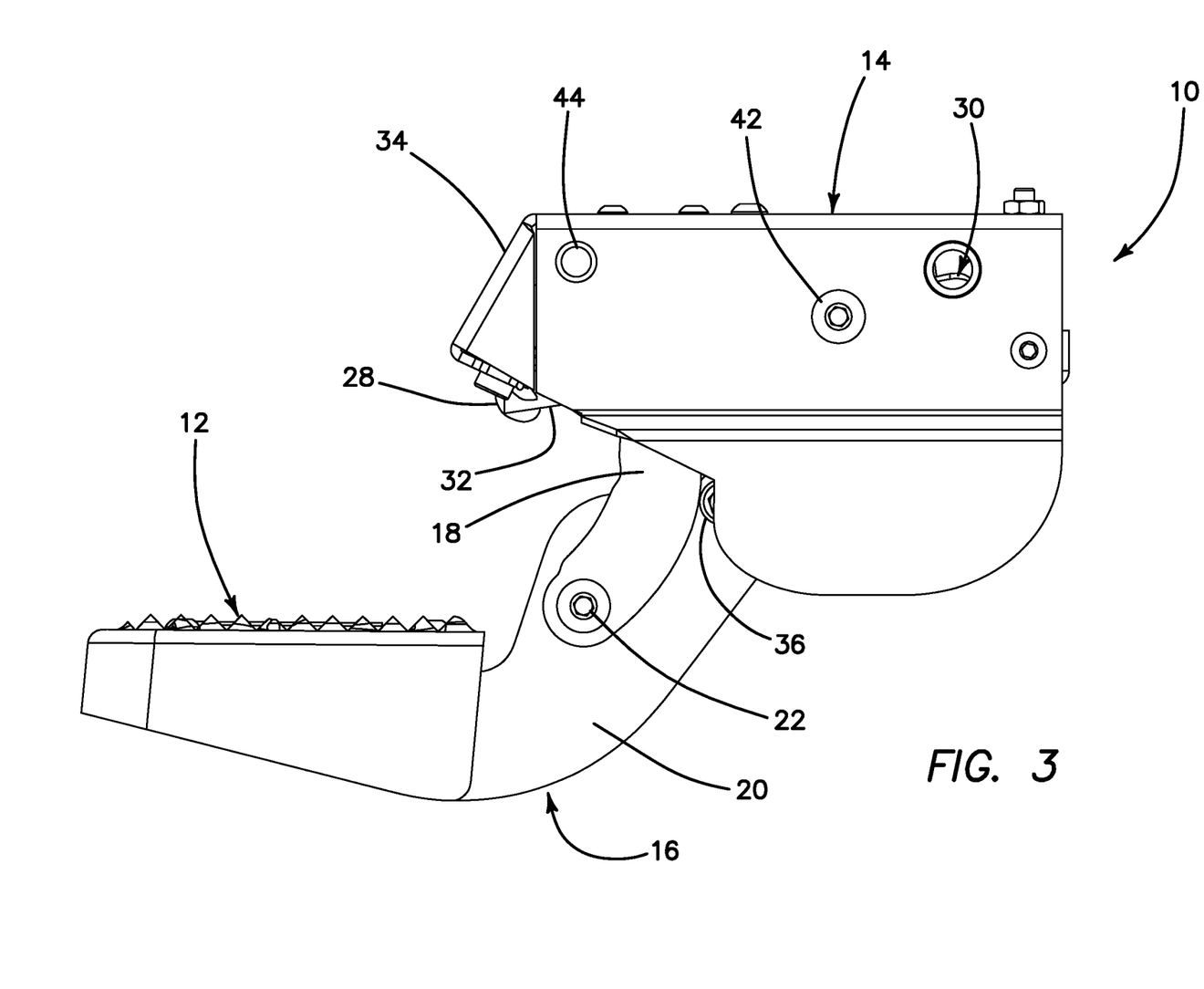
FIG. 3 is a side view of the step assembly of FIGS. 1 and 2.
Figure 4:
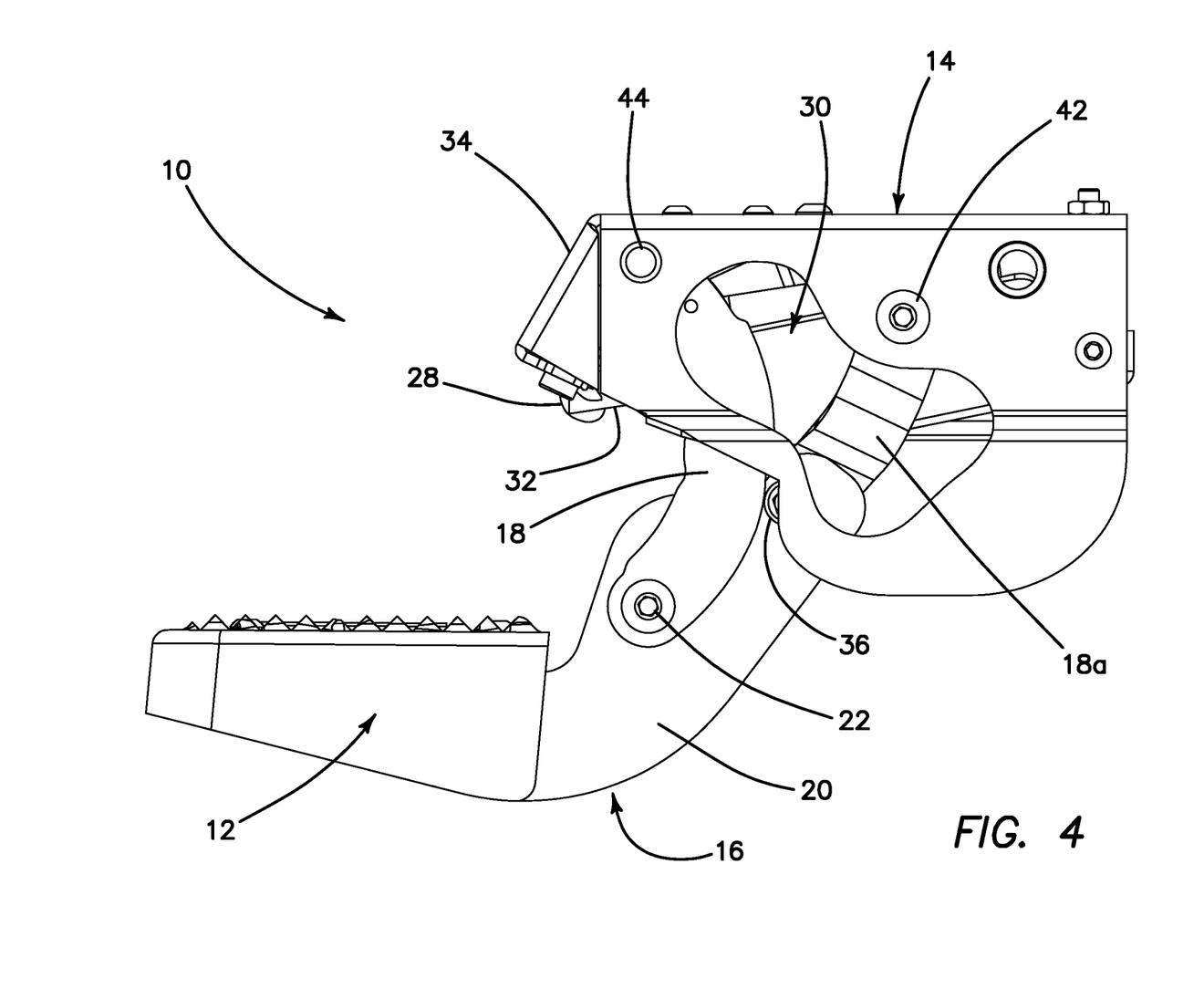
FIG. 4 is an enlarged view of the view of FIG. 3, showing the step in its deployed configuration.
Figure 5:
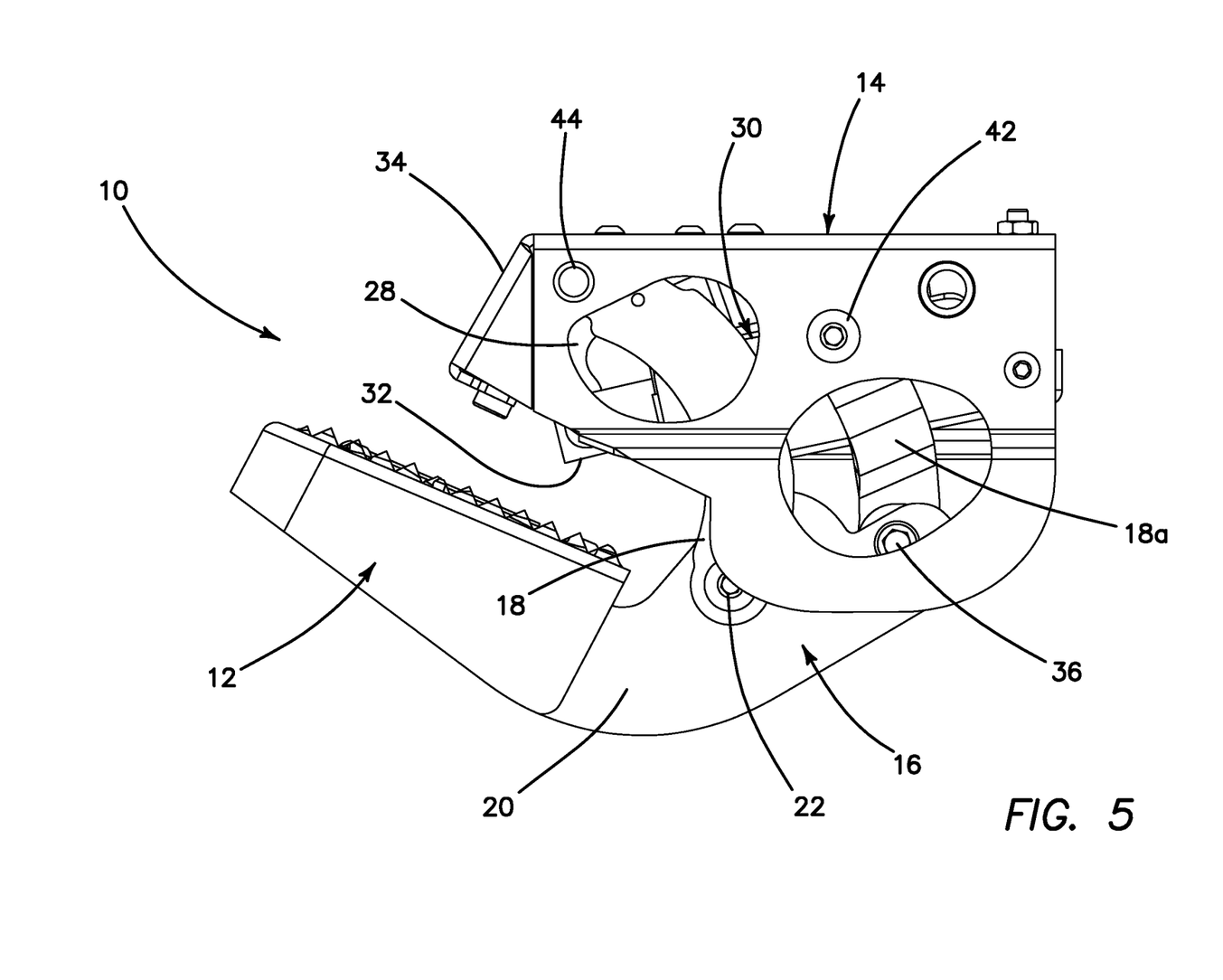
FIG. 5 is a view similar to FIG. 4, showing the step in a partially deployed configuration.
Figure 6:
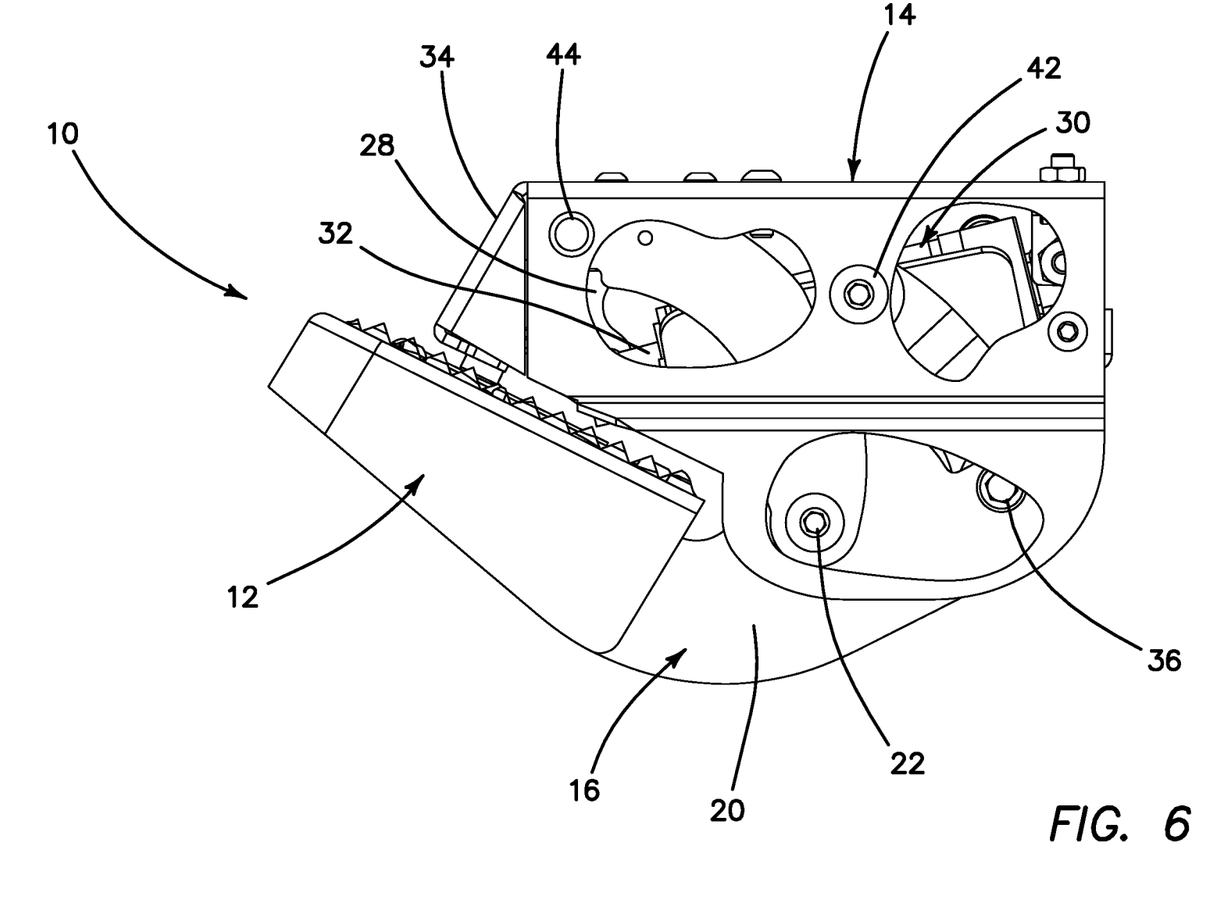
FIG. 6 is a view similar to FIGS. 4 and 5, showing the step in its retracted configuration.

An electric actuator 30 is mounted on the step assembly 10, as shown. Operating the actuator 30 causes the plunger 32, which has a stroke of between one-half and two inches, and preferably one inch or about one inch, from the plunger's fully retracted position and its fully extended position, to cause the distal end of the plunger 32 to engage the swing arm lever and to move it in one direction or the other, thereby rotating the main support shaft 24 to tilt the step 12 towards or away from the step base 14, between a fully retracted position, as shown in FIG. 6 and a fully extended position as shown in FIG. 4. Advantageously, this actuation approach is highly compact and space-efficient, and eliminates the need for gearing systems, as in prior art systems. FIG. 5 illustrates the step 12 in a partially deployed intermediate position.

The step base 14 includes a front downwardly depending cover or member 34. As shown in FIG. 6, when the step 12 is in its retracted position, an upper surface thereof engages the lower end of the member 34. From the retracted position, as the actuator 30 is activated, the plunger 32 extends along its stroke to push against the swing arm lever 28. Swing arm lever 28 is connected to the swing arm assemblies 16 through the shaft 24. As the swing arm lever 28 is pushed forwardly, the shaft 24 is rotated in a first direction, causing the swing arms 18 to also be pushed forwardly, in turn causing the step arms 20 and upper swing arms 18a to follow, as shown in FIG. 5, wherein the step is in its intermediate, partially deployed position. When the swing arms 18 engage stop bolts 36, as shown in FIG. 4, movement of the deployment mechanism stops, and the step 12 is locked in its fully deployed position, as shown.

Figure 8:
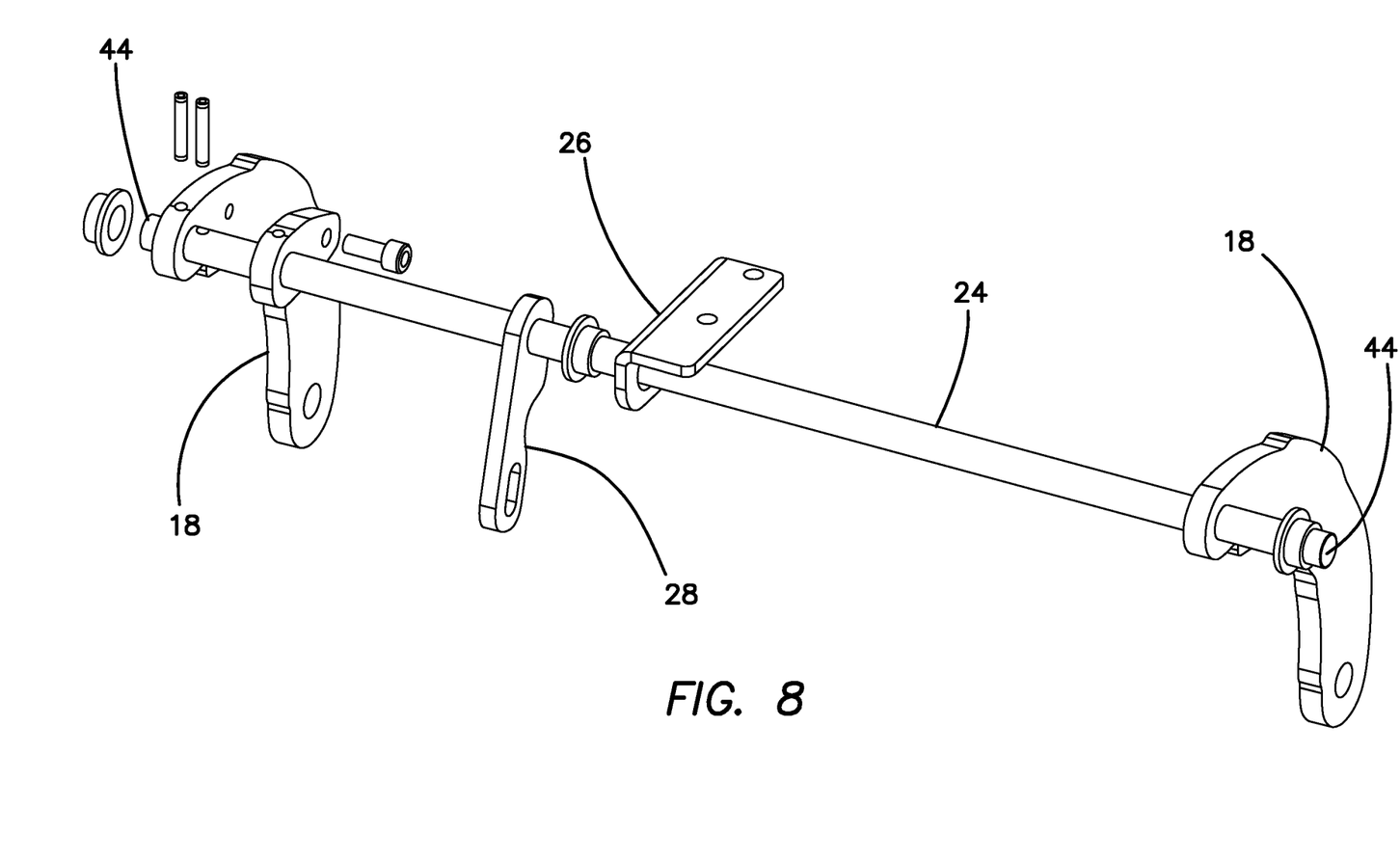
FIG. 8 is an isometric view of the main shaft assembly of the illustrated step assembly embodiment.
Figure 9:
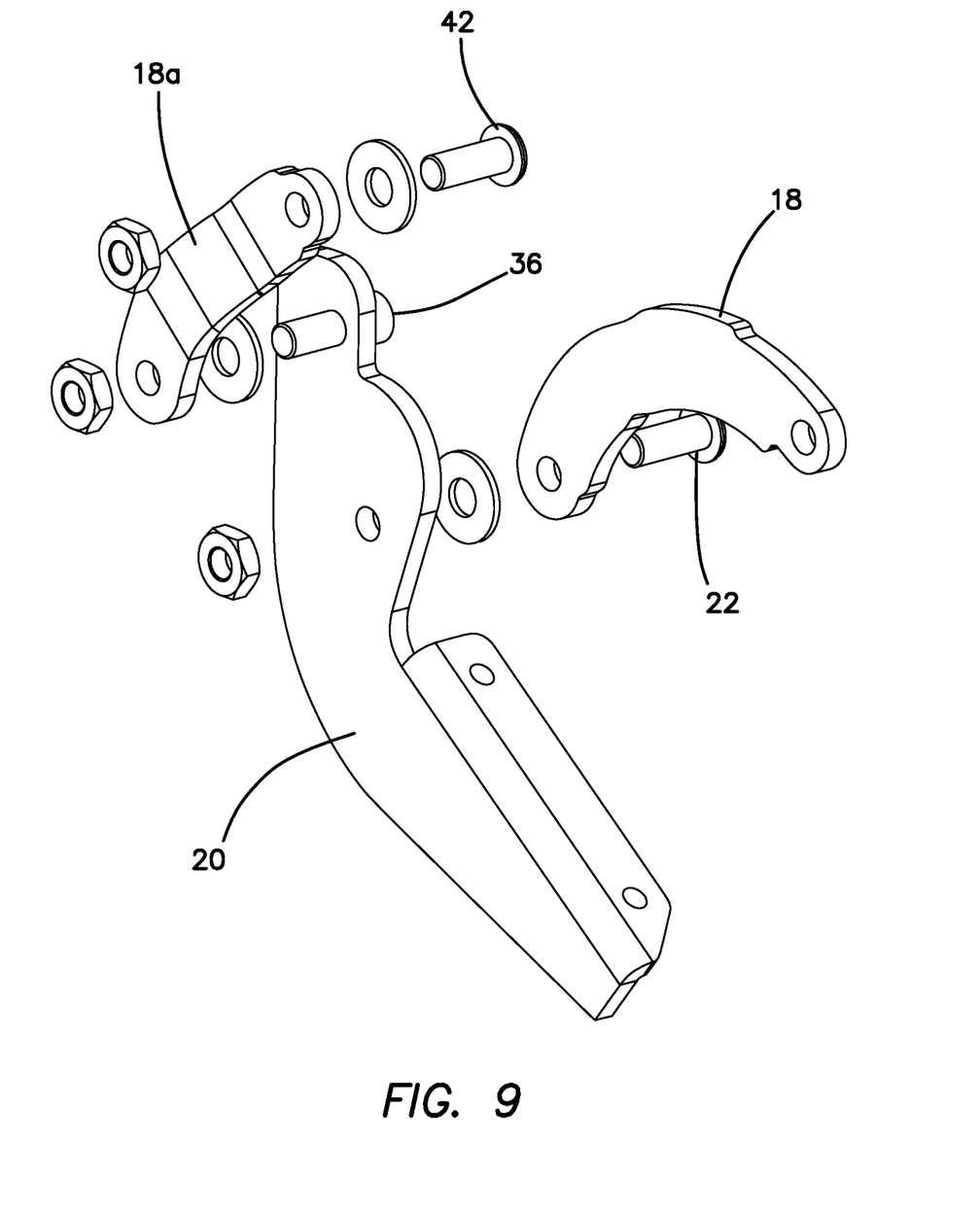
FIG. 9 is an isometric view of the lower arm assembly of the illustrated step assembly embodiment.

A protective housing 38 includes a shaft channel 40, and is disposed beneath the step base 40 to protect the deployment mechanism components from thrown rocks and other road debris, as well as general wear and tear. Upper ends of the upper swing arms 18a are secured to the step base 14 by means of a bolt 42 or other suitable fastener. Upper ends of the swing arms 18, as noted above, are secured to ends 44 of the shaft 24, as shown particularly in FIG. 8.

Activation of the actuator 30 occurs by movement of a door on the vehicle from its closed to open position, or vice-versa. For example, a contact switch of known construction may be positioned so that, when the door opens, the step is actuated from its retracted to its deployed orientation. When the door closes, the reverse occurs, with the step being actuated from its deployed to its retracted orientation, by retraction of the plunger 32. Retraction of the plunger 32 causes the swing arm lever 28 to fall back to its original position, thereby rotating the shaft 24 in an opposite direction, and thus, which causes the shaft 24 to rotated in the opposite direction, thereby moving the swing arms 18 rearwardly. This action causes the step 12 to retract from the position shown in FIG. 4 through the mid-position shown in FIG. 5, and ultimately to the fully retracted position shown in FIG. 6. In the case of an open-doored vehicle, such as an off-road vehicle, the actuator may be activated by a manual switch, rather than an action of closing or opening the door.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A deployable step assembly for vehicles, comprising:
a step base fixedly attachable to a vehicle;
a step member movably secured to the step base between a retracted position and a deployed position;
first and second swing arm assemblies which movably secure the step member to the step base, the first and second swing arm assemblies being connected to the step member on a first end thereof and being connected to the step base on a second end thereof;
an actuator disposed on the step base, the actuator comprising a plunger movable between a retracted position and an extended position, wherein extension of the plunger causes resultant movement of the first and second swing arm assemblies to move the step member to its deployed position and wherein retraction of the plunger causes resultant movement of the first and second swing arm assemblies to move the step member to its retracted position;
a stop member which engages a portion of the first or second swing arm assembly when the step member reaches its deployed position to prevent further deployment;
wherein each of the first and second swing arm assemblies comprise a step arm connected on one end to the step member and a swing arm pivotally connected at a first end thereof to the step arm;
the stop member comprising a first stop member which engages a portion of the first swing arm assembly and a second stop member which engages a portion of the second swing arm assembly, wherein the first stop member comprises a fastener disposed on the step arm of the first swing arm assembly and the second stop member comprises a fastener disposed on the step arm of the second swing arm assembly.

2. The deployable step assembly as recited in claim 1, wherein a stroke length of the plunger is less than two inches.

3. The deployable step assembly as recited in claim 1, wherein a stroke length of the plunger is between one-half and two inches.

4. The deployable step assembly as recited in claim 3, wherein the stroke length of the plunger is about one inch.

5. The deployable step assembly as recited in claim 1, wherein the step base comprises a front downwardly depending member, and the step member is in contacting engagement with the front downwardly depending member when the step member is in its retracted position.

6. The deployable step assembly as recited in claim 1, wherein the portion of the first swing arm assembly engaged by the first stop member is the swing arm of the first swing arm assembly and the portion of the second swing arm assembly engaged by the second stop member is the swing arm of the second swing arm assembly.

7. A deployable step assembly for vehicles, comprising:
a step base fixedly attachable to a vehicle;
a step member movably secured to the step base between a retracted position and a deployed position;
first and second swing arm assemblies which movably secure the step member to the step base, the first and second swing arm assemblies being connected to the step member on a first end thereof and being connected to the step base on a second end thereof;
an actuator disposed on the step base, the actuator comprising a plunger movable between a retracted position and an extended position, wherein extension of the plunger causes resultant movement of the first and second swing arm assemblies to move the step member to its deployed position and wherein retraction of the plunger causes resultant movement of the first and second swing arm assemblies to move the step member to its retracted position;
the actuator further comprising a swing arm lever, the swing arm lever moving in a first direction responsive to engagement with a distal end of the plunger when the plunger is moved to its extended position and moving in a second opposing direction responsive to disengagement of the plunger when the plunger is moved to its retracted position, wherein the movement of the swing arm lever in the first direction actuates the step member to move toward its deployed position and the movement of the swing arm lever in the second opposing direction actuates the step member to move toward its retracted position; and
a shaft rotatably disposed on the step base, the swing arm lever being disposed on the shaft so that movement of the swing arm lever in said first direction drives the shaft to rotate in a first direction and movement of the swing arm lever in said second direction drives the shaft to rotate in a second direction;
wherein a second end of the swing arm in each of the first and second swing arm assemblies is connected to the shaft, so that rotation of the shaft causes movement of the swing arm responsive to the shaft rotation.

8. The deployable step assembly as recited in claim 7, wherein rotation of the shaft in said first direction causes responsive movement of each of the swing arms to move the step member to its deployed position and rotation of the shaft in said second direction causes responsive movement of each of the swing arms to move the step member to its retracted position.

9. A deployable step assembly for vehicles, comprising:
a step base fixedly attachable to a vehicle;
a step member movably secured to the step base between a retracted position and a deployed position;
a swing arm assembly which movably secures the step member to the step base, the swing arm assembly being connected to the step member on a first end thereof and being connected to the step base on a second end thereof;
an actuator disposed on the step base, the actuator comprising a plunger movable between a retracted position and an extended position, wherein extension of the plunger causes resultant movement of the swing arm assembly to move the step member to its deployed position and wherein retraction of the plunger causes resultant movement of the swing arm assembly to move the step member to its retracted position; and
a stop member which engages a portion of the swing arm assembly when the step member reaches its deployed position to prevent further deployment;
wherein the swing arm assembly comprises a step arm connected on one end to the step member and a swing arm pivotally connected at a first end thereof to the step arm and the stop member comprises a fastener disposed on the step arm of the swing arm assembly.

10. The deployable step assembly as recited in claim 9, wherein the portion of the swing arm assembly engaged by the stop member is the swing arm.

11. A deployable step assembly for vehicles, comprising:
a step base fixedly attachable to a vehicle;
a step member movably secured to the step base between a retracted position and a deployed position;
a swing arm assembly which movably secures the step member to the step base, the swing arm assembly being connected to the step member on a first end thereof and being connected to the step base on a second end thereof;
an actuator disposed on the step base, the actuator comprising a plunger movable between a retracted position and an extended position, wherein extension of the plunger causes resultant movement of the swing arm assembly to move the step member to its deployed position and wherein retraction of the plunger causes resultant movement of the swing arm assembly to move the step member to its retracted position;
a stop member which engages a portion of the swing arm assembly when the step member reaches its deployed position to prevent further deployment;
wherein the actuator further comprises a swing arm lever, the swing arm lever moving in a first direction responsive to engagement with a distal end of the plunger when the plunger is moved to its extended position and moving in a second opposing direction responsive to disengagement of the plunger when the plunger is moved to its retracted position, wherein the movement of the swing arm lever in the first direction actuates the step member to move toward its deployed position and the movement of the swing arm lever in the second opposing direction actuates the step member to move toward its retracted position; and
a shaft rotatably disposed on the step base, the swing arm lever being disposed on the shaft so that movement of the swing arm lever in said first direction drives the shaft to rotate in a first direction and movement of the swing arm lever in said second direction drives the shaft to rotate in a second direction;
wherein a second end of the swing arm is connected to the shaft, so that rotation of the shaft causes movement of the swing arm responsive to the shaft rotation.

12. The deployable step assembly as recited in claim 11, wherein rotation of the shaft in said first direction causes responsive movement of the swing arm to move the step member to its deployed position and rotation of the shaft in said second direction causes responsive movement of the swing arm to move the step member to its retracted position.

* * * * *